United States Patent [19]

Saltzman

[11] Patent Number: 5,228,740
[45] Date of Patent: Jul. 20, 1993

[54] VEHICULAR WINDOW FRAME ASSEMBLY FOR SLIDING WINDOW PANES

[75] Inventor: Robert B. Saltzman, Coloma, Mich.

[73] Assignee: Chardon Rubber Company, Chardon, Ohio

[21] Appl. No.: 926,823

[22] Filed: Aug. 7, 1992

[51] Int. Cl.5 .............................................. B60J 1/18
[52] U.S. Cl. .................................. 296/146 N; 49/404; 49/440; 296/201
[58] Field of Search .............. 296/146 N, 146 M, 201; 49/380, 404, 440, 441

[56] References Cited

U.S. PATENT DOCUMENTS

| | | | |
|---|---|---|---|
| 3,321,234 | 5/1967 | Harrell et al. | 296/166 |
| 4,785,583 | 11/1988 | Kawagoe et al. | 49/404 |
| 4,848,832 | 7/1989 | Starnes | 296/166 |
| 4,924,628 | 5/1990 | Ruby et al. | 49/380 |
| 5,136,773 | 8/1992 | Mesnel et al. | 29/527.4 |

*Primary Examiner*—Robert R. Song
*Attorney, Agent, or Firm*—Renner, Kenner, Greive, Bobak, Taylor & Weber

[57] ABSTRACT

A window frame assembly for use in a vehicle body panel. The assembly has a frame portion with an inner and an outer periphery. Two channels are provided in the inner periphery of the frame to support one or more sliding window panes and at least one fixed window pane. A channel is also provided in the outer periphery of the frame. The sliding window pane is adapted to close the central portion of the frame and is slidable to a position substantially adjacent one of the fixed window panes. A sealing member is received in the channel supporting the fixed window panes to provide a sealing interface with the sliding window pane, at least when it is closed. An elastomeric cover is supported from the channel in the outer periphery as well as that channel in the inner periphery of the frame in which the fixed window panes and the sealing member are received. The cover has a peripherally extending centering lip which cooperates with the body panel to prevent contact between the frame and the body panel during the procedure by which the window frame assembly is mounted onto the vehicle.

7 Claims, 3 Drawing Sheets

VEHICULAR WINDOW FRAME ASSEMBLY FOR SLIDING WINDOW PANES

TECHNICAL FIELD

The present invention relates generally to window frame assemblies. More particularly, the present invention relates to window frame assemblies for vehicles. Specifically, the present invention relates to frame assemblies for vehicular backlites having at least one central, sliding window pane and fixed, side window panes.

BACKGROUND OF THE INVENTION

Vehicles, such as pickup trucks, have a rear window, or backlite, that is assembled into an opening in the body panel immediately behind the operator's seat. These backlites are provided to the truck manufacturer, or the after-market, as window frame assemblies. The current window frame assemblies that are commercially available generally have a welded metal frame, usually aluminum, which is sized to fit in a body panel opening. The frame has a generally bow-shaped outline, when viewed in elevation, with the upper corners being curved to fit the body panel opening. The upper portion of the frame provides the bow shape, and the lower rail portion, which is generally linear, is welded to the ends of the upper portion. Specifically, the upper and lower portions have beveled ends which are welded together to form the metal frame.

A continuous channel, the opening of which faces inwardly, is provided in the frame to support the upper and lower edges of the sliding window pane, or panes. A second inwardly opening channel supports a pair of fixed window panes. The side edges of the fixed window panes, adjacent the sliding window pane(s), are supported by vertical struts which are secured between the upper and lower portions of the frame. The remaining sides of the fixed window panes are each secured to, and are sealed in, the frame. A separate seal, having a lip adapted to engage the sliding window pane(s), is provided along the upper and lower edges of the sliding window pane(s) to prevent leakage of moisture to the interior of the vehicle when they are closed.

On occasion, the outer surface of the window frame assemblies have been provide with various decorative treatments. As a general rule, however, the outer surface is simply an exposed aluminum surface, or, as is frequently encountered, the frame may be coated with an elastomeric material which also covers the exposed outer surface of the frame. When the metallic window frame is exposed, a closure member is disposed to provide a sealing interface with the sliding windows, which, when closed, are generally disposed centrally of the frame, and, when open, are positioned behind the fixed windows. These assemblies are often secured to the vehicle body panel by a bead of urethane adhesive material. It must be kept in mind, however, that the frame assembly must be positionably inserted in the opening of the body panel with extreme care in order to ensure that the paint on the body panel is not scratched by the exposed metal of the frame during the procedure by which the frame assembly is mounted on the body panel of the vehicle.

Those window frame assemblies having an elastomeric covering, or having the periphery encapsulated within a gasket, are of two types—one of which does not have any exposed metal edges, thereby minimizing the possibility of defacing, or scratching, the painted surface of the vehicle during installation of the frame assembly. The assemblies that are so covered, or encapsulated, do, however, require a considerable amount of assembly time. For example, the gasket must be stretched over the frame. Gaskets for this purpose are normally provided with a groove which cooperates with a metal edge on the body panel opening. A separate sealing member is usually provided and is secured in the same channel within which the fixed windows are supported.

In order to mount this type window, the frame assembly is positioned in the appropriate opening, and the groove, presented from the gasket is stretched over the edge of the body panel to secure the assembly in the opening. The assembler must take care not to cut the gasket on the exposed metal edge inasmuch as a cut could not only result in an air, or liquid, leak but also constitute a noise source during vehicle operation. If the gasket is cut, a urethane adhesive or sealant must be applied. This is time consuming and increases the cost of assembly. The assembler must also be aware of the sharpness of the metal edge so that injuries, due to lacerations, do not occur.

Those frame assemblies employing an elastomeric covering generally include an integrally formed seal that is bonded only at the outer facing surface of the metal frame. As such, this arrangement requires the exercise of considerable care during installation. This type of window frame assembly is normally bonded to the body panel using a urethane adhesive.

Yet other frame assemblies have been provided that use a coating which is sprayed onto, or otherwise bonded to, the surface of the metal frame. As might be expected, considerable care must be taken to prevent the thin coating from being scratched or cut, both during storage and during the procedure by which the frame assembly is mounted in the panel opening of a vehicle. This type frame assembly requires that the manufacturer invest in spraying, or bonding, equipment which is expensive to purchase, install and maintain.

SUMMARY OF THE INVENTION

It is, therefore, a primary object of the present invention to provide an improved window frame assembly having a frame portion that is adapted to be secured, as by an adhesive, to a body panel in predetermined relation to an opening in the body panel.

It is another object of the present invention to provide a window frame assembly, as above, wherein an elastomeric cover is secured to overlay the exposed surface of the frame with the cover being secured to the frame by a first mounting tab received in an outer, peripheral channel provided in the frame and by a second mounting tab received in an inner, peripheral channel, also provided in the frame.

It is a further object of the present invention to provide an improved window frame assembly, as above, wherein a continuous centering and supporting lip extends outward from the cover to engage the body panel in which the window frame assembly is installed.

It is another object of the present invention to provide an improved window frame assembly, as above, wherein a metal frame presents an outwardly facing, peripheral channel for receiving the first mounting tab and an inwardly facing, peripheral channel for receiving the second mounting tab and further wherein the channels also define retaining ribs for cooperative interaction with the mounting tabs in order to secure the cover to the frame.

These and other objects of the invention, as well as the advantages thereof over existing and prior art forms, which will be apparent in view of the following detailed specification, are accomplished by means hereinafter described and claimed.

In general, a window frame assembly for mounting one or more sliding windows in an opening through the body panel of a vehicle, and embodying the concepts of the present invention utilizes a frame having an outer periphery, an inner periphery, a front face and a mounting face. First and second inwardly opening, or facing, channels are formed in the frame. An outwardly opening, or facing, channel is also formed in the frame. Latching means are provided in both the first and second inwardly facing channels.

One or more sliding window frames are disposed in the first, inwardly facing channel for movement between closed and open positions. Sealing means have opposed securing shoulders that cooperatively interact with the latching means in the second, inwardly facing channel in order to secure the sealing means in the second channel. Lip means are presented from the sealing means for engaging the sliding window frames. Fixed window panes are also disposed in the second inwardly facing channel linearly adjacent the sealing means for closing a portion of the frame and overlapping the sliding window frames, at least when the sliding window frame is moved to at least the closed position.

A cover means is secured in abutment with the front face of the frame, as by mounting tabs presented from the cover and adapted to be secured within appropriate channels in the frame. A lip portion extends outwardly from the cover to engage the body panel for centering the frame assembly relative to the opening in the body panel.

One exemplary embodiment, a window frame assembly embodying the concepts of the present invention and adapted for use with a vehicle body to fill an opening is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
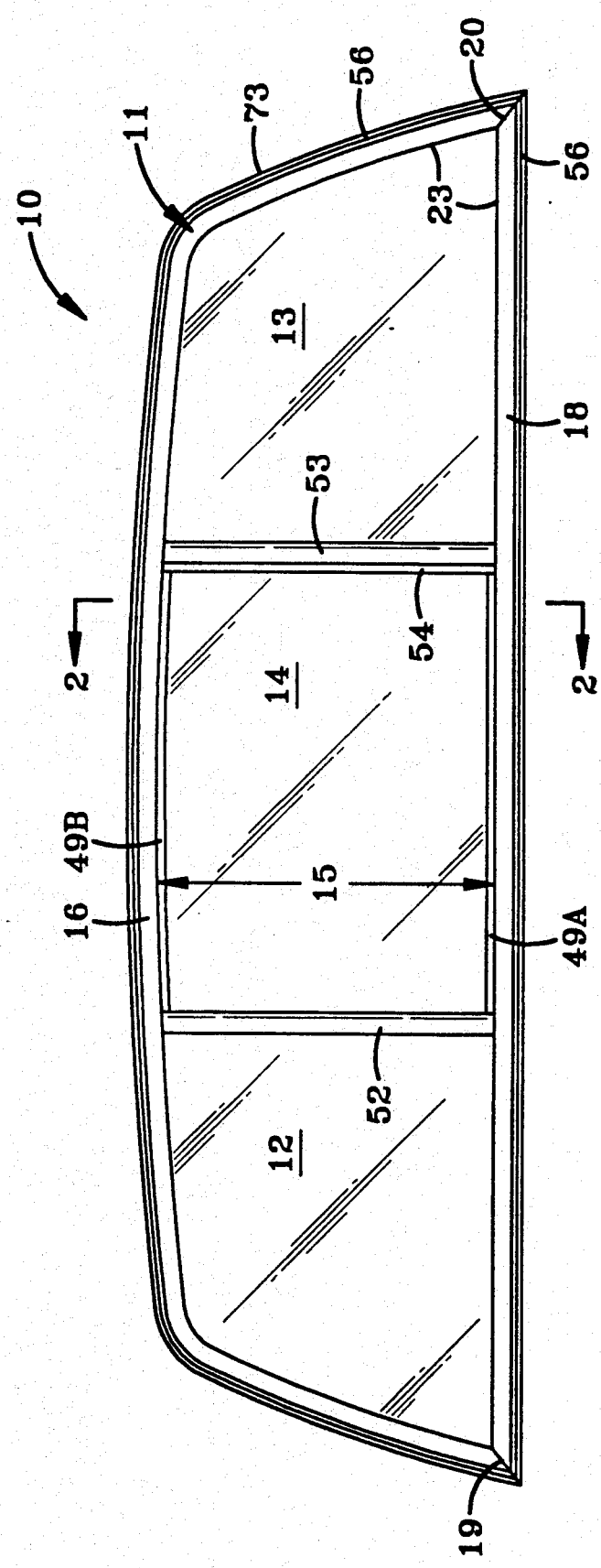
FIG. 1 is an elevational view of a frame assembly incorporating the present invention.

One representative form of a window frame assembly embodying the concepts of the present invention is designated generally by the numeral 10 on the accompanying drawings. As best seen from FIG. 1, the representative window frame assembly 10 includes a metal frame 11, a pair of laterally spaced, fixed window panes 12 and 13 and a sliding window pane 14. In the alternative, a pair of sliding window panes can be provided, and that arrangement is preferred by some vehicle operators. The metal frame 11 is a welded structure having an upper bow portion 16 and a lower, or bottom, rail portion 18 which are welded at the bevelled corners 19 and 20 formed at the intersection of the bow portion 16 with the opposite ends of the normally linear, rail portion 18.

Figure 2:
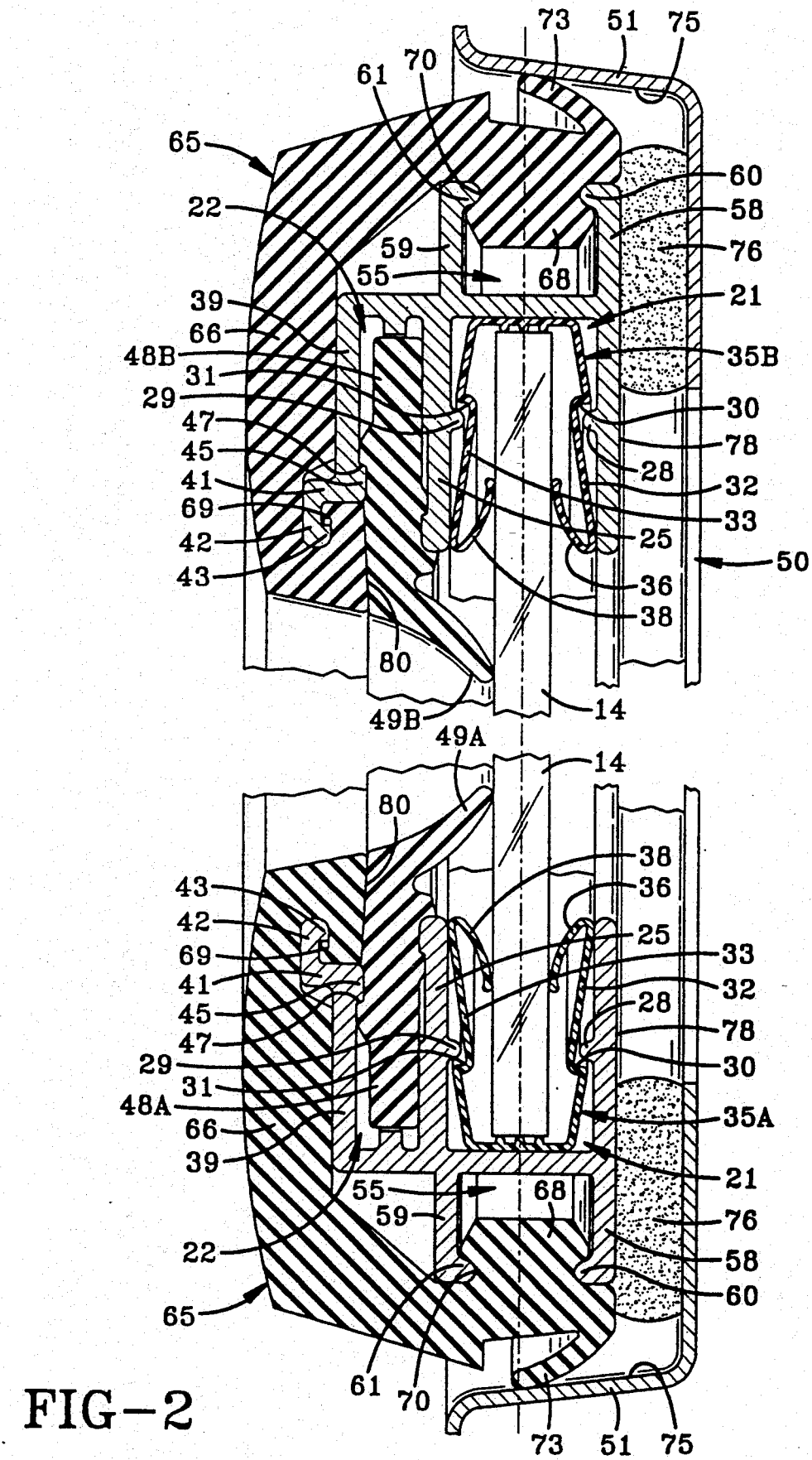
FIG. 2 is a vertical section taken substantially along line 2—2 of FIG. 1.
Figure 3:
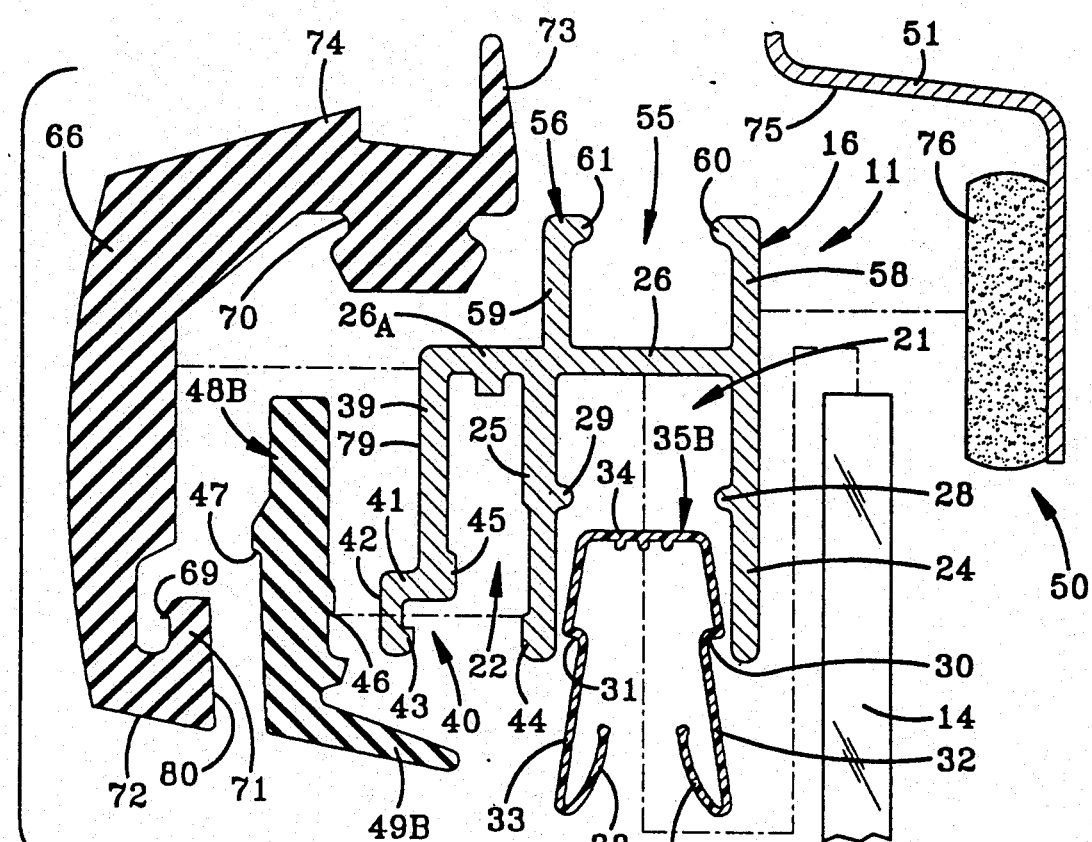
FIG. 3 is an exploded cross section of the frame assembly depicted in FIG. 2.
Figure 3:
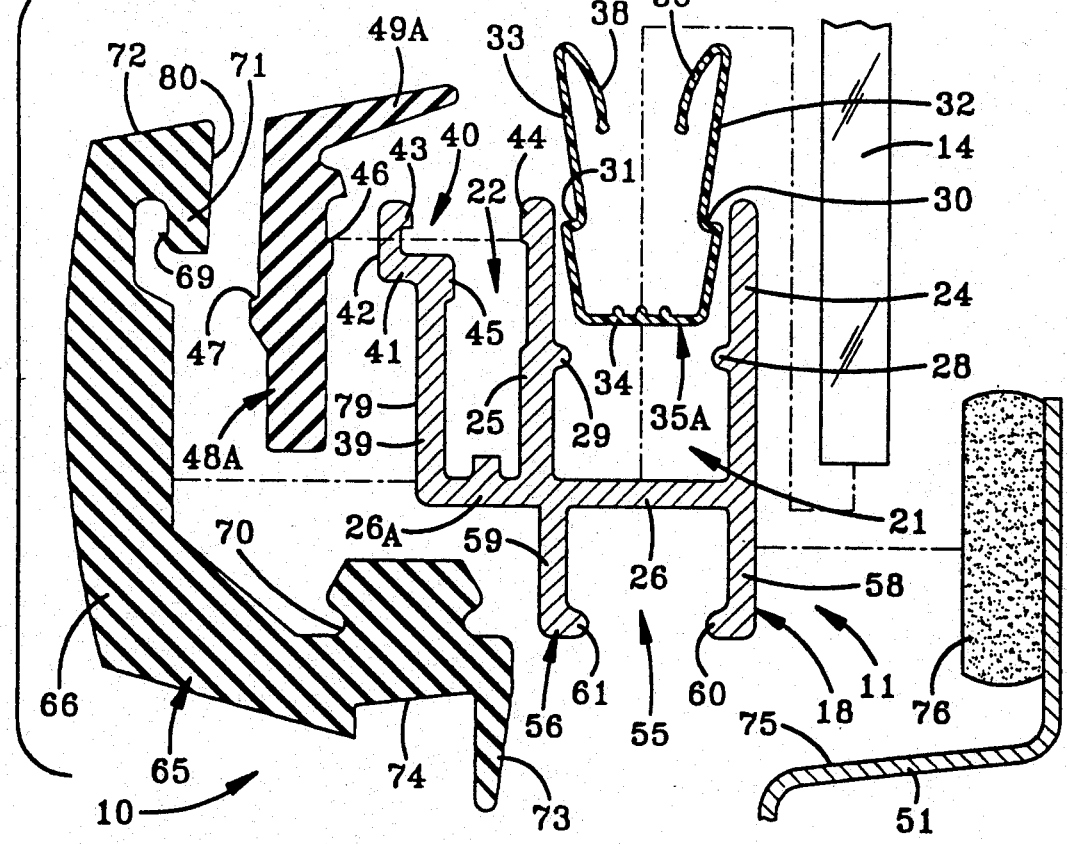

With reference to FIGS. 2 and 3, it will be observed that both the bow portion 16 and the rail portion 18 of the frame 11 have identical cross sections. As such, the description set forth herein as to the frame 11 shall apply as equally to the bow portion 16 as to the rail portion 18, unless a difference is specifically identified. Accordingly, the frame 11 has a pair of inwardly facing first and second channels 21 and 22, respectively, which open continuously about the inner periphery, or perimeter, 23 of the frame 11. Relative to the vehicle (not shown) in which the window assembly 10 is to be installed, the first channel 21 is the innermost channel, and the second channel 22 is the outermost channel. The sliding window pane 14 may be a single member, as shown, or two members which open from the center. The sliding window pane 14 preferably latches on the operator side of the vehicle—the left side, as viewed in FIG. 1. The window 14 is preferably capable of sliding to the right (away from the operator) to open, at least until the height of the window pane 14 fills the vertical dimension 15 measured between the guide members 35B in the channel 21 extending along the bow portion 16 and the guide members 35A in the channel 21 extending along the rail portion 18. As will be hereinafter more fully explained, the guides 35 support the window pane 14 so that it might slide along the direction of the first channel 21.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be reference by virtue of a letter suffix employed in combination with the numerical designation employed for general identification of that structural member, component or arrangement. Thus, there are two guides which are generally identified by the numeral 35, but the specific, individual guides are, therefore, identified as 35A and 35B in the specification and on the drawings. This same suffix convention shall be employed throughout the specification.

The first, or innermost, channel 21 has transversely spaced, first and second side walls 24 and 25, respectively, which extend from a base wall 26. Side wall 24 serves as the inner side of the first channel 21, and the continuous wall 25 serves as the outer side of that channel. The side walls 24 and 25 present opposed protuberances in the nature of retaining ribs 28 and 29, respectively, which can be continuous or disposed at spaced locations. The retaining ribs 28 and 29 cooperate with corresponding notches 30 and 31 formed in the side walls 32 and 33 of the plastic guides 35.

With continued reference to the guides 35, the side walls 32 and 33 extend outwardly from a base wall 34. A pair of opposed spring walls 36 and 38 are secured to the distal ends of the side walls 32 and 33 and extend between the side walls 32 and 33 toward the base wall 34 of each guide 35A and 35B in substantially parallel relation to the side walls 32 and 33. The spring walls 36 and 38 are disposed cooperatively to the sliding window pane 14 in order to maintain that window pane substantially centered transversely of the channel 21. The length of the guides 35A and 35B are such as to extend the full length of the usable, linear extent of channel 21 in both the bow portion 16 and the rail portion 18 of the frame 11, or the guides 35 may each have end surfaces, not shown, which abut the edges of the sliding window pane 14 and move therewith.

The second, outermost channel 22 is bounded by the continuous, common wall 25, which serves as the inner side wall of channel 22, by an outer side wall 39 and by a base wall $26_A$. The base wall $26_A$ constitutes an extension of the base wall 26 of the first channel 21. The outer side wall 39 has a stepped portion 40 defined by a substantially horizontal offset wall 41 and an upstanding wall 42. A retaining rib 43 is presented from the distal end of the upstanding wall 42 and extends into the inwardly facing channel 22. The side walls 25 and 39, including the stepped portion 40, thus define the inwardly facing, second channel 22, which extends continuously along the inner periphery, or perimeter, 23 of the frame 11.

The respective side walls 25 and 41 present generally opposing protuberances in the nature of latch ribs 44 and 45, which cooperate with the securing shoulders 46 and 47 that extend outwardly in opposite directions from each seal member 48A and 48B. The latch ribs 44 and 45 cooperate with the respective securing shoulders 46 and 47 to maintain the sealing members 48 in the desired position in the second channel 22. The seal members 48A and 48B each have a lip portion 49 which is disposed in abutment with the sliding window pane 14 to prevent water and dirt from entering the vehicle through the opening 50 formed in the body panel 51 to receive the window frame assembly 10. The sealing members 48B and 48A are, respectively, secured in the second channel 22 in the bow portion 16 and the rail portion 18 of the frame 11 and therefore sealingly engage both the upper and lower edges of the sliding window pane 14, at least when it is in the closed position.

The fixed window panes 12 and 13 are also disposed in the second channel 22, but the fixed window panes are separated from the sealing members 48A and 48B by the vertical frame struts 52 and 53 (FIG. 1). The fixed window panes 12 and 13 are secured in the channel 22 in both the upper bow portion 16 and the lower rail portion 18 by using a conventional mounting means such as rubber seals or adhesives. Thus, it will be apparent that the entire volume of the second channel 22 is filled with the combination of the sealing members 48A and 48B as well as the fixed window panes 12 and 13.

The sliding window pane 14 has at least one side stile 54 affixed thereto which provides a gripping means as well as a member from which a latch means, not shown, may be mounted for use by the operator to open, close and secure the sliding window pane 14. Such a latch means would be operatively interposed between the side stile 54 and the vertical strut 53. Gripping and latching mechanisms are well known to the art, but a particularly good example thereof is the subject of U.S. Pat. No. 5,028,082, owned by the assignee hereof.

The frame 11 also has an outwardly opening channel 55 that is formed in the outer perimeter, or periphery, 56 of the frame 11. The channel 55 is defined by transversely spaced side walls 58 and 59 which extend substantially perpendicularly from the base wall 26. For convenience, the side wall 58 of channel 55 may be aligned with the inner side wall 24 of channel 21, both of which may share a common base wall 26. The distal ends of the side walls 58 and 59 present opposed retaining ribs 60 and 61, respectively. The area encompassed by the side walls 58 and 59, as well as the base wall 26 define the main cavity of the channel 55 while the opposed retaining ribs 60 and 61 define the mouth of the channel 55.

A cover 65, which may conveniently be made from an elastomeric material, has a body portion 66 from which first and second mounting tabs 68 and 69 are presented. The first mounting tab 68 is insertably receivable within the outwardly facing channel 55 of the frame 11 to assist in securing the cover 65 to the frame 11. The tab 68 has a waist portion 70 which cooperates with the opposed retaining ribs 60 and 61 to secure the first mounting tab 68 within the channel 55.

The second mounting tab 69 is removably received within the stepped portion 40 of the second inwardly facing channel 22 to lend further assistance in securing the cover 65 to the frame 11. The mounting tab 69 is presented from a finger 71 that extends from the inner periphery 72 of the cover 65 to engage the retaining rib 43 on the upstanding wall 42 of the stepped portion 40. As shown, the upstanding wall 42 may, therefore, be fully received between the body portion 66 and the finger 71 on the cover 65 to assist in securing the cover 65 to the frame 11.

A protective centering, or support, lip 73 projects outwardly from the body portion 66 of the cover 65 and extends continuously about the outer perimeter 74 of the cover 65. During the process of mounting the frame assembly 10 within the opening 50 in the body panel 51 of the vehicle, the lip 73 will engage the painted surface 75 on the body panel 51 to prevent scratches, or other marring, of the surface 75. Moreover, the elasticity of the lip 73 will tend to center the frame assembly 10 in the opening 50 of the body panel 51. The frame assembly 10 may be secured in the opening 50, and sealed to the body panel 51, as by a urethane adhesive 76 which may be applied in a conventional manner to either the body panel 51 or the mounting face 78 on the frame 11 prior to the moment at which these two structures are brought into abutment. It is preferable to apply the urethane adhesive 76 to the body panel 51. In any event it is the rear face 79 of the frame 11 that will be directed toward the outside of the vehicle, and thus be exposed to the elements.

The body 66 of the cover 65 has a blocking surface 80 that is disposed in contiguous abutment not only with the sealing members 48A and 48B but also with the fixed window panes 12 and 13. It will be appreciated at this point that the elastomeric cover 65 will not only conceal the rear face 79 of the frame 11 from the environment but will also provide the protective centering lip 73 that precludes damage to the painted surface 75 of the body panel 51. By virtue of the contiguous juxtapositioning of the blocking surface 80 against the sealing members 48, and the fixed window panes 12 and 13, the cover 65 will aid in sealing the frame assembly 10 against penetration by the exterior atmosphere. The elastomeric cover 65 can have a color added to match, contrast with or complement the color of the body panel, thus enhancing the visual effect of the vehicle.

Fabrication of the window frame assembly 10 can best be discerned from FIG. 3, which is an exploded view thereof. The guides 35A and 35B are inserted in selected portions of the channel 21, which extends continuously along the bow and rail portions 16 and 18, respectively, of the frame 11. The guides 35 are pressed into the appropriate portions of the channel 21 until the retaining ribs 28 and 29 are seated in the respective notches 30 and 31. This will maintain the guides 35 in the proper location and permit the sliding window pane 14 to be installed prior to the time the bow portion 16 is bonded to the rail portion 18. The adhesive, or sealant, for the fixed window panes 12 and 13 is preferably placed in the channel 22 prior to, or simultaneous with, installation of the fixed panes 12 and 13. After the fixed window panes 12 and 13, and the sliding window pane 14, are positioned in the proper location the bevelled corners 19 and 20 are brought into registration and welded, or otherwise bonded together. Following the securement of the corners 19 and 20 the sealing members 48 are installed in position in the proper portions of the continuous channel 22 that extends along the bow portion 16 and the rail portion 18.

The cover 65 is then installed on the metal frame 11 by stretching the outer edge of the body portion 66 over the outer periphery 56 of the frame 11 until the mounting tab 68 is aligned with the channel 55. The mounting tab 68 is then forced into the channel 55 until the waist portion 70 of the first mounting tab 68 is engaged by the retaining ribs 60 and 61 in the channel 55. The finger portion 71 of the cover 65 is then forced between the upstanding wall 42 and either the sealing members 48 or the fixed window panes 12 and 13 until the mounting tab 69 lockingly engages the retaining rib 43 presented from the upstanding wall 42. The frame assembly 10 is then ready for installation with the body panel 51.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a window frame assembly embodying the concepts of the present invention permits facile assembly thereof without damage to the vehicle in which it is to be mounted and also accomplishes the other objects of the invention.

I claim:

1. A frame assembly for mounting one or more sliding window panes in an opening through the body panel of a vehicle, the frame assembly comprising:
   a frame having an outer periphery, an inner periphery, a front face and a mounting face;
   a first inwardly opening channel formed in the frame;
   a second inwardly facing channel formed in the frame;
   latching means located interiorly of said second, inwardly facing channel;
   an outwardly opening channel formed in the frame;
   sliding window means disposed in the first inwardly facing channel for movement between closed and open positions;
   sealing means having opposed securing shoulders cooperating with said latching means in the second inwardly facing channel for securing the sealing means therein;
   lip means presented from said sealing means for sealingly engaging the sliding window means; and
   fixed window means also disposed in the second inwardly facing channel linearly adjacent the sealing means for closing a portion of the frame and overlapping the sliding window means when the sliding window means is moved to at least the open position; and
   cover means disposed in abutment with the front face of said frame;
   a lip portion extending outwardly from said cover to engage the body panel for centering the frame assembly relative to the opening in the body panel; and
   mounting means presented from said cover and adapted to be secured within said second inwardly directed channel and said outwardly directed channel.

2. A frame assembly, as set forth in claim 1, wherein said mounting means presented from said cover further comprises:
   first and second mounting tabs presented from said cover for operative engagement with said second inwardly facing channel and said outwardly facing channel.

3. A frame assembly, as set forth in claim 2, wherein said first mounting tab presented from said cover further comprises:
   a neck portion;
   opposed retaining ribs provided in said outwardly facing channel;
   said neck portion engageable by said retaining ribs to retain said first mounting tab in said outwardly facing channel.

4. A frame assembly, as set forth in claim 2, wherein said second mounting tab presented from said cover further comprises:
   a finger presented from said cover;
   said finger terminating in said second mounting tab;
   a stepped portion in said second inwardly directed channel;
   a retaining rib extending into said stepped portion;
   said second mounting tab engageable by said retaining ribs to retain said second mounting tab in said inwardly facing channel.

5. A frame assembly, as set forth in claim 4, wherein said stepped portion further comprises:
   a horizontal wall;
   an upstanding wall;
   said retaining rib extending from said upstanding wall for engagement with said second mounting tab.

6. A frame assembly, as set forth in claim 5, wherein said cover means further comprises:
   a blocking surface for providing a continuous sealing interface with said fixed window means and said sealing members received in said second inwardly facing channel.

7. A frame assembly, as set forth in claim 1, further comprising:
   means for securing said mounting face to said body panel in closing relation with the opening.

* * * * *